Feb. 26, 1963  D. C. DAVIS ET AL  3,078,972
POWER TRANSMISSIONS
Filed Sept. 17, 1959  2 Sheets-Sheet 1
FIG.1.
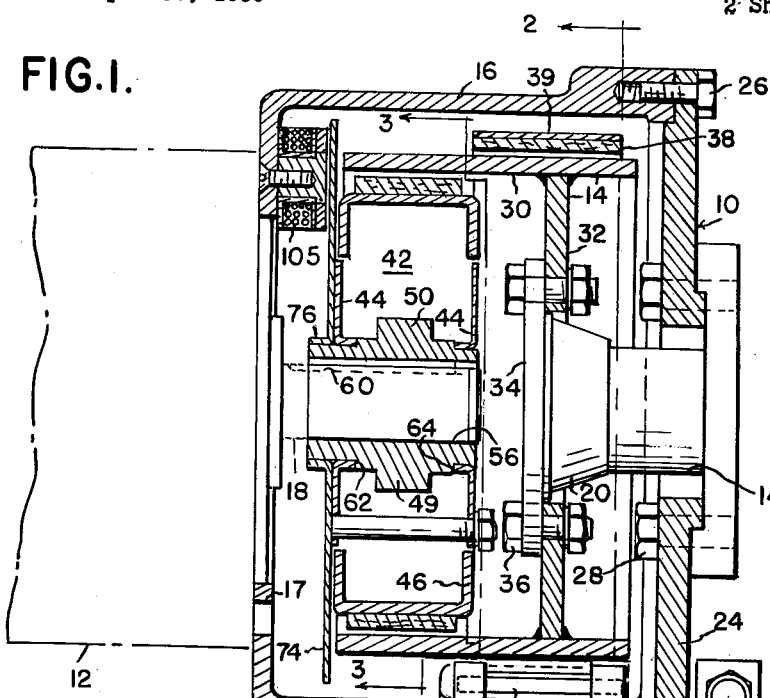
FIG.4.
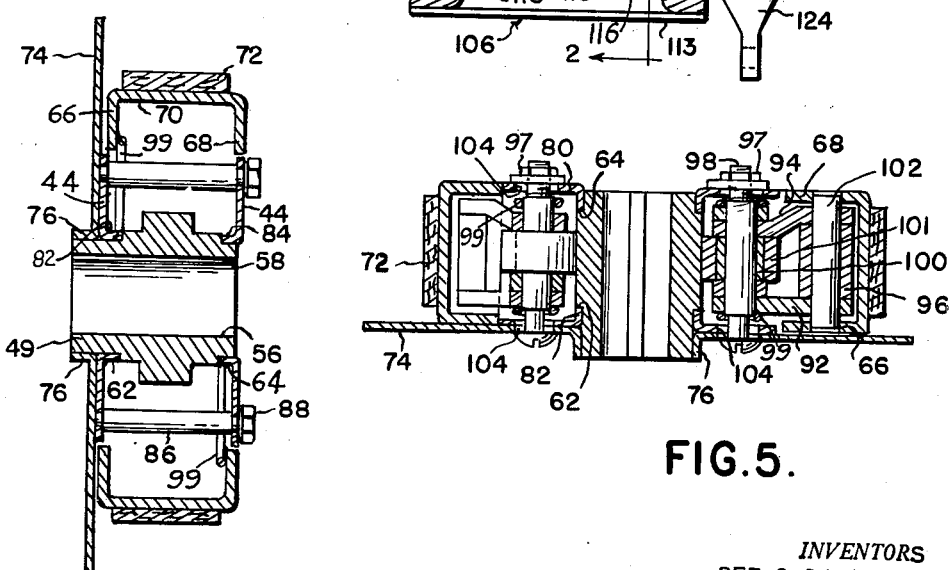
FIG.5.
INVENTORS
DEE C. DAVIS
BY FRED A. TRAINO
JOSEF DICHTIAR
*Whittemore, Hulbert & Belknap*
ATTORNEYS Feb. 26, 1963     D. C. DAVIS ET AL     3,078,972
POWER TRANSMISSIONS
Filed Sept. 17, 1959     2 Sheets-Sheet 2

INVENTORS
DEE C. DAVIS
BY FRED A. TRAINO
JOSEF DICHTIAR

ATTORNEYS 3,078,972
POWER TRANSMISSIONS
Dee C. Davis, Detroit, Mich., Fred A. Traino, Kettering, Ohio, and Josef Dichtiar, Detroit, Mich., assignors to Wolverine Diesel Power Company, Detroit, Mich., a corporation of Michigan
Filed Sept. 17, 1959, Ser. No. 840,641
6 Claims. (Cl. 192—35)

This invention relates to power transmissions and, more particularly, to mechanical devices of the statical friction type, such as clutches, dynamical brakes, drives, etc.

This invention further relates to a device for automatically transmitting torque from a power source such as an electric motor or an internal combustion engine to a driven machine, axle, or wheel without the necessity for the ordinary manual means for engaging and disengaging the device. Coupling devices, such as a clutch, are commonly used in the power trains of automobile vehicles or in applications where it is required to disengage the sections of a rotating shaft so that one section can turn while the other is motionless. It is also utilized for engaging the sections when separated so that the two can turn together for transmitting the power or torque.

This invention will be discussed in its application as an automatic clutch and/or as a dynamical brake to self-propelled and towed vehicles, and more particularly to aircraft ground support equipment vehicles and to its ability to automatically engage and disengage the power source and the axle of the driven wheels, although it should be understood that this device may be employed in other applications under many other conditions where the specifications call for the automatic engagement and disengagement of a plurality of shafts without the intervention of the vehicle operator.

The prior art discloses various automatic and manually operated mechanical clutch devices which consist in part of a driving member and a driven member. The present invention departs at this point from the prior art devices and is distinguishable therefrom by means of an arrangement of an intermediate member which functions as an automatic medium to establish or to release the mechanical continuity between the driving or powered member and driven member. The intermediate member may be defined as a rotor which is equipped with elements which are elastically restricted by suitable resilient means and outwardly operable to automatically connect and disconnect two independent coaxially rotatable sections representing the driving and driven members. The rotor consists of two major components comprising a cam fixedly connected to and coaxially rotatable with the input shaft of the power source or driving member, and an angularly declinable member assembly which is coaxially rotatable with the cam and which is additionally radially expandable to automatically connect the driving and driven members while simultaneously undergoing a limited elastically restricted angular range or interval in either direction relative to the cam.

The angularly declinable member assembly consists of a retainer, as an example a pair of side plates, which is coaxially rotatable with the cam and is also coaxially rotatable relative to the cam. In addition, the assembly includes a system of expandable members, as an example contacting elements or shoes having corresponding linkage assemblies, which are disposed around the cam and are guided or directed by the retainer. The expandable members are actuated by the cam so as to expand outwardly and establish the desired continuity between the driving and driven member with an increase of the angle of declination of the retainer relative to the cam until the desired contact of the expandable elements with the driven member has been established.

The contacting elements and linkages have the same angular deflection while simultaneously undergoing an expanding displacement to engage the surface of engagement of the driven member.

The mechanical continuity is obtained between the driving and driven members without slippage between the members. Another function of the intermediate member including the cam is to change the tangentially directed forces from the input shaft to obtain radially acting components of forces, the magnitudes of which are sufficient to tighten the contacting elements against the smooth engagement surface of the driven member for exceeding the limit of skidding.

Certain parameters are utilized to determine the required ratio between the magnitude of the tangential force acting at the contact point of the camming surface and the link pair and the force exerted outwardly on the corresponding contacting element. The parameters include a given magnitude the following: the coefficient of skidding friction of the materials; the dimensions of the cam; the shape of the camming surface; the initial angle of relative inclination of links composing the link pairs; and the radius of the surface of engagement.

Therefore, an increase load increases the ratio of the components of forces, compelling the contacting elements against the engagement surface. The "non-slippage" condition is maintained at any magnitude of load so that the transmission of load is functionally unlimited or that the limit of magnitude of the applied power coincides with the limit of the strength of material of the parts of the present power transmitter.

A proper chosen correlation between the parameters provides a compact device which is capable of transmitting high torques.

When the power input is removed or when the resisting torque is reduced to zero, the tightness between the surfaces of engagement vanishes and the forces of the elastical deflections of the intermediate member returns it to a zero position relative to the driving member thereby leaving the driven member in a free wheeling position.

An object of the present invention is to automatically engage the clutch or power transmission upon application of power or torque to the driving member without the intervention of the vehicle operator when a resistance is encountered by the driven member whereby the clutch or power transmission immediately connects the driving member and driven member at a small difference in speed between the members by pressure automatically increasing with the increase in the torque so as to allow the driven member to directly accelerate at a speed of the same rate as the driving member without extreme shock.

Another object of this invention is to automatically disengage the clutch from the driven member without the intervention of the operator when the motivating power is removed from the driving member or when the resistance of the driven member is reduced to zero.

Still another object of this invention is to provide a power transmission which may function as a clutch to automatically engage the driving member with the driven member when an action is encountered by the driven member and which may function as a dynamical brake to reverse and change the driven member into a driving member thereby transmitting the external acceleration applied to the driven member to accelerate the source of power.

A further object of this invention is to positively and automatically maintain the driving force without slippage as load is increased.

A still further object of this invention is to provide a device which when applied to driven axles and wheels continuously re-establishes a mechanical connection between the driving member and the axle when the load is removed from the axle by the wheels leaving the ground on uneven terrain.

Still another object of the invention is to provide a power transmission of the statical friction type which can be applied over a limitless range of torque transmissions dependent only on the strength of the material.

A further object of the invention is to utilize linkage assemblies or means for expanding the contacting elements or shoes for engaging the drum of the driven member.

A still further object of the invention is to utilize rotatable cam means on the driving or power member which actuates the linkage assemblies within a limited range of angular deflectability of the medium member relative to the driving member to expand the contacting elements outwardly to engage the internal smooth surface of the drum of the driven member and accelerate the driven machine directly at the same rate as the driving member.

Another object of the invention is to provide mechanical or electromagnetic means for preventing angular rotation of the intermediate members immediately upon actuation of the power supply but which permit the cam to actuate and expand the contacting shoes radially to engage the surface of engagement of the driven member within the range of the angular deflectability of the medium member relative to the driving member.

Still another object of the invention is to mount the electromagnetic means on the driving member when the device is to be used as a clutch or on the driven member when the device is to be used as a clutch and dynamical brake in the same device.

A further object is to provide a power transmission which lends itself admirably to applications where compactness of construction, high capacity, reliability in operation, minimum of wear, ready accessibility, and simplicity and economy of construction are essential.

Other objects and features of the invention will become apparent as the description proceeds, especially when taken in conjunction with the accompanying drawings, illustrating preferred embodiments of the invention, wherein:

FIG. 1 is an elevational view in section of the clutch and brake assembly;

FIG. 4 is a sectional view of the clutch assembly taken on the line 4—4, FIG. 3;

FIG. 5 is a sectional view of the clutch assembly taken on the line 5—5, FIG. 3;

Figure 2:
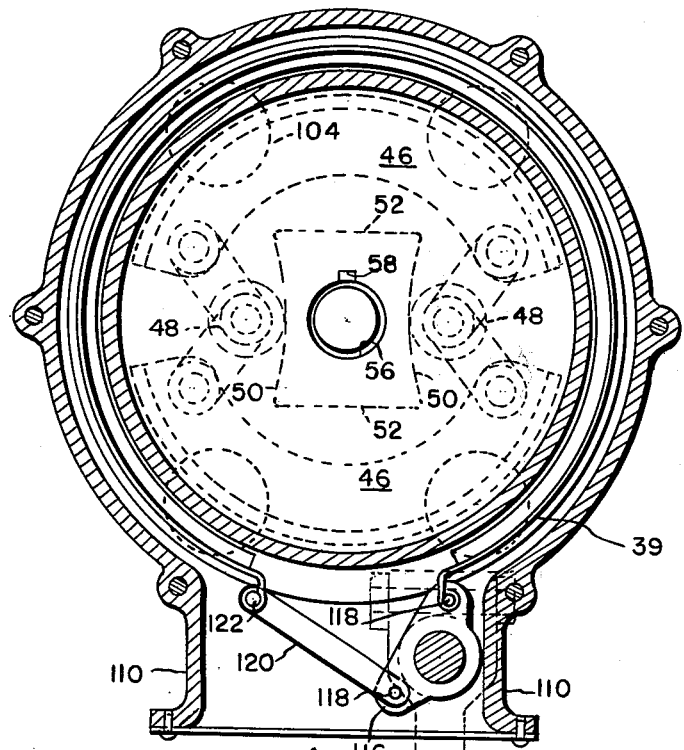
FIG. 2 is a sectional view taken on the line 2—2, FIG. 1.

Referring now to FIG. 1, there is shown the clutch and brake assembly identified by numeral 10. The assembly 10 is interposed between a rotary power source such as an electric traction motor or an internal combustion engine and the rear axle of a vehicle. The power source and the load are connected respectively to the driving member 12 and the driven member 14 which includes the rotatable drum 30 as will be explained later.

The clutch and brake assembly 10 has a housing 16 which provides a confined space and may be of any configuration to meet existing specifications. The driving member 12 and the driven member 14 each have a shaft or end terminating in the assembly 10 and are indicated at 18 and 20 respectively. The housing 16 has a body portion 22 and an end portion or plate 24 which is secured to the body portion 22 by a plurality of bolts 26 located near the outer periphery of the plate 24. Fastening means, such for example as bolts 28, are used for mounting the assembly 10. The power source or driving member 12 is fitted to engage the vertical wall 17 of the housing 16. The end of the driving member 12 extends into the confined space of the housing 16 where it engages the clutch assembly through a key connection, as will be explained hereinafter.

A circumferential rotating member or drum 30 forming part of the driven member 14 is located in the housing 16. The drum 30 has a flange 32 which is secured to the flange 34 of the driven member 14 by a plurality of bolts 36. Appropriate frictional material 38 such as asbestos is employed on the brake band 39. The brake band 39 is of the conventional type and is arranged around the drum 30 as will be explained later.

Figure 3:
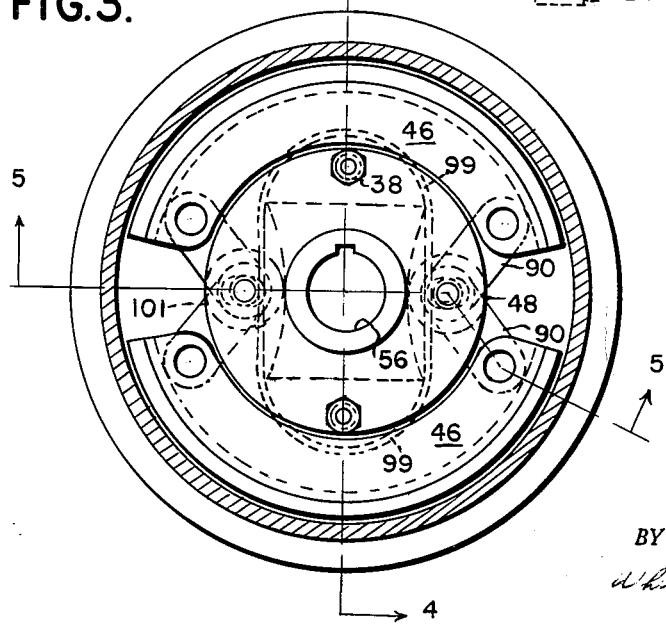
FIG. 3 is a partial sectional view of the clutch assembly taken on the line 3—3, FIG. 1.

The clutch assembly 42 is of relatively simple construction and includes the movably interconnected intermediate members which comprise two major components, a pair of angularly rotatable side plate 44 which are limited with respect to the powered element and a pair of contacting elements or shoes 46 having corresponding linkage assemblies 48 which are angularly rotatable and in addition thereto are radially expandable so as to permit the contacting surface of the shoes 46 to engage the surface of engagement of the driven drum 30. A cam 49 is keyed to the driving member 12 and has a pair of concave or camming surfaces 50 as is shown in FIGS. 2 and 3. The straight surfaces 52 are not used for camming surfaces. The cam 49 also has a bore 56 with a keyway 58 provided therein receiving the shaft or end 18. A key 60 located in the shaft 18 is inserted in the keyway 58 to provide the key connection previously referred to herein between the shaft 18 and cam 49. The cam 49 has a pair of stepped down portions on the outer periphery and thereby provides shoulders 62 and 64.

The pair of arcuately shaped contacting elements 46 each have a channel-shaped cross section and are placed on opposite sides of the cam 49. Each contacting element 46 provides a pair of parallel flanges 66 and 68 connected by a web or wall portion 70. Friction lining material 72, such as asbestos, is secured to the outer surface of the wall 70.

Further included as part of the clutch assembly 42 is a base plate or disc 74 having a flange 76. The pair of side plates 44 have flanges 82 and 84 respectively. The side plates are smaller in size than the disc 74 and form a retainer. One of the side plates 44 is flush with the inner side of the disc 74 and is arranged so that its flange 82 abuts the shoulder 62. The other plate 44 is substantially parallel to the first plate 44 and is located on the driven side of the cam 44. The flange 58 abuts the shoulder 64. A pair of bolts 86 connects plates 44. Nuts 88 are utilized to retain the plates in a properly spaced relationship.

Linkage assembly 48 is comprised of a pair of links 90. Each link, as shown in FIG. 5, is substantially U-shaped in cross-section so as to provide a flat side 92, a bent side 94, and a wall portion 96 which connects sides 92 and 94 and is located directly opposite the open end of the U-shaped section. The open ends of the links 90 are interconnected. The links have holes provided therein, which receive a pin 98 that extends through the disc 74, and plates 44 to provide the movable pivot pin connection 98. A self locking nut 97 is provided on the end of the pin 98 in such a manner that the pin 98 may be moved slightly in the axial direction. A cylindrical and hollow insert 100 is placed around the pin 98 in between the sides of the linkage assembly 48. A cam follower 101 is located around the insert 100 and provides a bearing surface for the cam surface 50. The solid ends of the links 90 are connected to the contacting elements 46 and have holes provided in the side flanges 66 and 68 in which pins 102 are inserted to provide fixed pivot connections. Each pin 102 extends through flange 66, the closed end of the link 90, and flange 68, as shown in FIG. 5. Slots 104 are provided in the retainer or plates 44 to permit the pivot pin connection 98 to move radially when expanding or contracting the contacting elements.

A pair of U-shaped resilient wires 99 each having their ends connected around the movable pivot connections 98 biases the pin connections 98 in a direction to disengage the elements 46 from the drum 30 once the power has been removed from the driving member 12. The driving member 12 upon application of power thereto overcomes the force of the springs 99 to expand the elements 46.

In order to obtain the necessary engagement and tightness between the contacting elements and the smooth surface of the driven member, it is necessary for the intermediate members including the side plates 44, shoes 46 and linkage assemblies 48 to rotate through a small angular deflection relative to the powered member. This may be accomplished in different ways. First, at certain magnitudes of acceleration of the source of power the required angular deflection or lagging which is the retardation of movement can be performed by inertia of the mass of the intermediate members. When required the mass can be added as a ballast. Secondly, when the acceleration of the powered member is small as in the majority of applications, means are provided for the actuation at the first step. The means may be either of a mechanical or electromagnetic type. The radial expandability of the intermediate members permits the use of a simple mechanical obstruction fixedly located on the frame of the driving member and so dimensioned as to prevent the intermediate members initially contracted from following the rotation of the powered member up to the point of establishing the continuity between the contacting elements and the surface of engagement of the driving member, at which instance the obstruction is passed over by means of the radial expansion of the members.

Another way of accomplishing the initial retardation is by use of an electromagnetic device as is shown in the drawing. The closing and opening of the electrical field is interconnected to the application of and retraction of the power to be transmitted. The power required by actuation of the engagement is negligible compared with the power actually transmitted. The power applied to the electromagnetic field after the continuity has been established represents a small loss of power.

A plurality of electromagnetic devices 105 are provided between the inner side of the vertical wall 17 and the plate 74. The purpose of these devices 105 is to provide a magnetic field which will prevent the side plates 44 and the linkage assemblies 48 from turning initially upon the application of the motivating power until the cam surfaces 50 have actuated the movable pivot connections 98 in a radial direction to establish the desired mechanical continuity. The electromagnets 105 are of the conventional type and are effective upon energization to engage and retard the disc 74 which holds the side plates 44 and linkage assemblies 48 from rotating thereby causing immediate engagement of the shoes 46 with the driven drum 30 within the range of angular deflectability of the plates 44. The electromagnets 105 re-establish continuity of engagement of the clutch assembly 42 with the drum 30 when the driven wheels of the vehicle leave the ground on uneven terrain.

The brake band 39 previously referred to is of the conventional type. Various means may be utilized in stopping the drum so as to prevent rotation of the driven member 14 once the motivating power has been removed from the driving member 12. As shown in FIGS. 1 and 2, the body portion 22 has a window portion 106 having sides 108 and 110 substantially rectangular in cross-section in which the brake operating mechanism 112 is inserted. A plate 113 closes the window portion 106 thereby providing a complete enclosure for the clutch and brake assembly.

The brake operating mechanism 112 may be operated either manually or automatically, immediately upon the removal of the motivating power. The drawings show a manually operated mechanism having a shaft 114 extending through the sides 108. A pair of rotatable discs 116 are fixedly mounted on the shaft 114 inside the window portion 106. A pair of pivot pins 118 are located between the discs 116 parallel to the shaft 114. A link 120 connects one of the pins 118 to a third pivot pin 122 around which one end of the brake band 39 is wrapped. The other end of the brake band 39 is wrapped around the remaining pivot pin 118. An arm or crank 124 is provided on the shaft 114. Rotation of the arm 124, as shown in FIG. 2, in a clockwise direction will release the brake band 39. Rotation of the arm 124 in a counter-clockwise direction will apply the brake mechanism 112.

In operation, immediately upon the application of power to the driving member 12 the clutch 42 will automatically connect the driving member 12 to the driven member 14 by friction to allow the driven member 14 to accelerate with a speed directly proportional to the rate at which the driving member 12 is operating without relying on centrifugal action of any kind which usually results in excessive shock engagements at high speeds. However, immediately upon initiation of the motivating power the electromagnets 105 come into play and set up a magnetic field which immediately prevents the side plates 44, shoes 46 and linkage assemblies 48 from angularly rotating until the camming surfaces 50, as best illustrated in FIGURES 2 and 3 move the movable pivot connections 98 in a radial direction so as to urge the shoes 46 into friction engagement with the drum 30, within a fraction of the first revolution of the driving member 12. This frictional engagement takes place during the first revolution regardless of the speed of the driving member 12 due to the shape of the camming surfaces 50 and the initial retardation of the side plates 44, shoes 46, and linkage assemblies 48. The electromagnetic devices 105 are energized at any given number of revolutions of the driving member 12. It is preferable to have the electromagnetic devices 105 operate at low current so that at low speed operation continual energization of the electromagnetic devices 105 is not harmful. However, it is preferable for certain applications to terminate the current to the electromagnetic devices 105 after the first revolution. If the electromagnetic devices 105 were not utilized the power source and driving member 12 would rotate the cam 49, plates 44 and linkage assemblies 48 and would not permit the camming surfaces 50 to extend the movable pin connections 98 until many additional revolutions had taken place.

Once the camming surfaces 50 have actuated the movable pin connections 98, the opposite linkage assemblies 48 are radially expanded, which in turn forces the contacting elements 46 outwardly until the elements 46 establish the desired continuity with drum 30 and drives the driven member 14. As the load of the driven member is increased, the force acting outwardly on the contacting elements is positively and automatically increased by the same ratio excluding any slippage between the elements 46 and drum 30.

As torque requirements increase, the acting force against the driven drum 30 will increase in direct proportion due to the action of the camming surfaces 50 against the linkage assemblies 48.

The greater the torque requirement the greater is the force applied to the shoes 46 to hold them in engagement with the driven drum 30. Once the motivating power is removed from the driving member 12, the clutch assembly 42 automatically disengages. The brake mechanism 112 may be actuated either manually or automatically to prevent the free wheeling or coasting of the driven member 14 which results after the power has been removed. By applying the brake mechanism 112 the driven member 14 is easily stopped.

The device is capable of automatically transmitting high torque in a compact package over a sufficient range of torque transmission. The range is limited only by the strength of the material utilized in the construction of the device. The device automatically disconnects the mechanical engagement of the driving motor and driven machine once the motivating power has been removed.

The automatic means for connecting and disconnecting the plurality of shafts is independent of the speed of the driving member and does not require the intervention of the vehicle operator once the motivating power has been applied to the driving member.

As previously mentioned, the device may also operate as a dynamical braking unit. When the retardation is accomplished by means of electromagnetic field the retarding electromagnet fixedly located on the frame of the powered source permits the device to operate as a clutch with a free wheeling arrangement only. When the electromagnets are relocated on the driven member the magnets function identically as when serving as a clutch. However, in the latter case, the driven member overruns and the electromagnets actuate the disengaged intermediate element immediately in the opposite direction to that of the driven member thereby reversing the sequence of operation. The driven member becomes a driving member and the external acceleration is transmitted to accelerate the source of power. This operation is known as dynamical braking.

The drawings and the foregoing specification constitute a description of the improved power transmissions in such full, clear, concise and exact terms as to enable any person skilled in the art to practice the invention, the scope of which is indicated by the appended claims.

What we claim as our invention is:

1. A clutch comprising a driving member, a driven member including a portion surrounding and spaced from said driving member, a cam connected to said driving member, a retainer having guide slots therein carried by said cam, said retainer being angularly deflectable with respect to said cam, a plurality of radially expandable contacting assemblies located around the periphery of said cam in the space between said cam and said portion of said driven member, said assemblies including pivot connections which are received in the slots provided in said retainer, said pivot connections being angularly deflectable with respect to said cam, and retarding means independent of said cam interconnected between said driven member and said retainer for providing a small angular displacement between said retainer and said contacting assemblies with respect to said driving member after the driving member has begun to rotate, said cam being effective upon actuation by said driving member to move said pivot connections in said slots and thereby radially expand said contacting assemblies during said angular displacement to engage and functionally connect said assemblies with said portion of said driven member.

2. The clutch defined in claim 1 wherein said retarding means include electromagnetic means.

3. A clutch comprising a driving member, a driven member axially aligned with said driving member and including a cylindrical portion surrounding and radially spaced from said driving member, a cam connected to said driving member, a pair of axially spaced rigidly interconnected angularly deflectable plates carried by said cam, said plates having oppositely facing guide slots therein, a plurality of radially expandable contacting assemblies located around the periphery of said cam in the space between said cam and said cylindrical portion of said driven member, said assemblies including shoes having their adjacent ends interconnected by pivot connections which have the ends thereof received in the oppositely facing guide slots provided in said plates, electromagnetic means provided between said driven member and said plates for providing a small angular displacement between said plates and said contacting assemblies with respect to said driving member after the driving member has begun to rotate, said cam being effective upon actuation by said driving member to move said pivot connections in said slots and thereby radially expand said shoes during said angular displacement to engage and functionally connect said shoes with said cylindrical portion of said driven member, said electromagnetic means adapted to be energized during the first revolution of said driving member.

4. The clutch defined in claim 3 wherein an even number of expandable contacting assemblies is provided.

5. The clutch defined in claim 3 wherein resilient means are provided on said pivot connections for contracting said shoes after power has been removed from said driving member.

6. The clutch defined in claim 5 wherein said resilient means are in the form of wires which are carried by said pivot connections.

References Cited in the file of this patent

UNITED STATES PATENTS

| 250,433 | Fraser | Dec. 6, 1881 |
|---|---|---|
| 1,045,480 | Wallmann | Nov. 26, 1912 |
| 1,925,897 | Fawick | Sept. 5, 1933 |
| 1,967,749 | Ferguson et al. | July 24, 1934 |
| 2,214,391 | Weydell | Sept. 10, 1940 |

FOREIGN PATENTS

| 15,775 | Great Britain | of 1905 |
|---|---|---|
| 233,081 | Germany | Mar. 30, 1911 |
| 1,098,662 | France | Mar. 9, 1955 |